United States Patent [19]
Ganssle

[11] Patent Number: 4,787,580
[45] Date of Patent: Nov. 29, 1988

[54] LARGE SOLAR ARRAYS WITH HIGH NATURAL FREQUENCIES

[75] Inventor: Eugene R. Ganssle, Skillman, N.J.

[73] Assignee: General Electric Company, East Windsor, N.J.

[21] Appl. No.: 749,228

[22] Filed: Jun. 27, 1985

[51] Int. Cl.⁴ .............................................. B64G 1/44
[52] U.S. Cl. .................................. 244/173; 244/158 R
[58] Field of Search ............... 244/173, 158 R, 158 A, 244/159; 52/108

[56] References Cited

U.S. PATENT DOCUMENTS

| | | | |
|---|---|---|---|
| 3,473,758 | 10/1969 | Webb | 244/173 |
| 3,510,086 | 5/1970 | Arbeitlang et al. | 244/173 |
| 3,544,641 | 12/1970 | Billerbeck, Jr. | 244/173 |
| 3,606,211 | 9/1971 | Roersch et al. | |
| 3,863,870 | 2/1975 | Andrews et al. | 244/173 |
| 4,133,501 | 1/1979 | Pentlicki | 244/173 |
| 4,293,731 | 10/1981 | Schweig et al. | 244/173 |

FOREIGN PATENT DOCUMENTS

| | | | |
|---|---|---|---|
| 0140738 | 5/1985 | European Pat. Off. | 244/173 |
| 1926983 | 8/1971 | Fed. Rep. of Germany. | |

Primary Examiner—Joseph F. Peters, Jr.
Assistant Examiner—Lynn Fiorito
Attorney, Agent, or Firm—Clement A. Berard, Jr.; Robert Ochis

[57] ABSTRACT

A solar array structure for use with satellites requiring large areas of solar arrays. Each array is a single continuous structure having continuous longitudinal members which in a stowed condition enable the panel to be wrapped around the satellite within its launch vehicle. In a deployed configuration, the longitudinal members are reconfigured to provide substantially increased stiffness in the direction of winding.

20 Claims, 8 Drawing Sheets

LARGE SOLAR ARRAYS WITH HIGH NATURAL FREQUENCIES

BACKGROUND OF THE INVENTION

The present invention relates to the field of artificial satellites and more particularly to the field of solar array support structures for external mounting on such satellites.

It is well known in the artificial satellite art that electronic systems in the satellite are powered through the use of solar cells disposed in arrays on flat panels which are oriented so that the solar cells collect solar radiation. As the versatility and power requirements of satellites have increased, the solar array area has increased correspondingly. For example, the SATCOM-I satellite has a solar array area of about 75 square feet. Current solar power systems, such as those used on the SATCOM family of satellites employ solar arrays in the form of a plurality of flat panels which are hinged together and folded accordian style for stowing during launch. The array is unfolded in orbit to extend to its fully size. Such structures provide solar arrays of sufficient size to meet current power requirements and are sufficiently stiff that there is not significant interaction between the attitude control system and the array structure.

Direct broadcast satellites which are now being designed will require much larger solar arrays to meet their power requirements. Such arrays are hundreds of square feet in area and require a several fold increase in the number of folding panels in order to be stowable in the launch vehicle. This means adding hinges and increasing the span of the deployed array, which lowers the natural frequencies of the panel structure even when the latest light weight materials are used. These natural frequencies may be low enough that significant coupling between the satellite attitude control system and the array structure can result.

Such undesired coupling can lead to satellite instability and/or excessive motion of the solar arrays relative to the satellite during attitude changes and corrections. More complicated control of attitude adjustment procedures and the expenditure of increased amounts of attitude control propellant will be required to control such motion even if instability does not result. Such increased propellant expenditure shortens the useful life of a satellite by reducing the time during which the satellite may be maintained on station in a proper attitude.

A solar array structure for a satellite is needed which is stowable for launching and has sufficient stiffness when deployed to prevent undesired interactions between the attitude control system and the solar array support structure even when the array total area is on the order of hundreds of square feet.

SUMMARY OF THE INVENTION

A solar array support frame comprises a pair of substantially parallel spanwise continuous structural members which run the full length of the array from its inboard end to its outboard end and a plurality of chordwise continuous structural members. Each of the chordwise continuous structural members is connected to both of the spanwise continuous members to secure the spanwise members in spaced-apart substantially parallel relation. This solar array frame supports a solar array substrate on which solar cells for powering a satellite are bonded.

The spanwise members are fabricated of a material which when in a stowed configuration, has dimensions perpendicular to the array major surface which are small enough that the entire frame and the solar array substrate it supports can be wound about the satellite for launching without exceeding the yield stress of the spanwise members in their stowed configuration. A reconfiguration of the spanwise members during the array deployment process significantly increases their stiffness perpendicular to the major surface of the solar array substrate.

In one embodiment, each spanwise member includes two parallel full length structural beams and a plurality of flexible webs. The flexible webs extend from one beam to the other. In the deployed configuration, these webs hold the two beams apart to render the spanwise member stiff perpendicular to the surface of the array. In the stowed configuration, the beams are disposed adjacent to each other in the same plane as the chordwise members with the flexible webs bent in an arc. These webs are fabricated of a material which is stiff enough to hold the beams in position when deployed and flexible enough to permit the beams to be placed in their stowed configuration without permanent deformation of the webs. The stowed configuration of the spanwise members makes wrapping the solar array around the satellite feasible. During deployment, the elastic memory of the flexible webs moves the beams into their deployed configuration. The effect is to create a spanwise member whose deployed depth (stiffness) is substantially greater than that of the individual beams. The frame is stiff enough in this deployed configuration that interaction between the attitude control system and the array structure is prevented.

In one embodiment, the energy contained in the wrapped, stowed array due to the curvature of its spanwise members is controlled during deployment by restraint cables running from continuous rotation viscous dampers at the outboard ends of the arrays to the inboard ends of the arrays. These cables run over pulleys spaced along the length of the frame.

DETAILED DESCRIPTION

Figure 1:
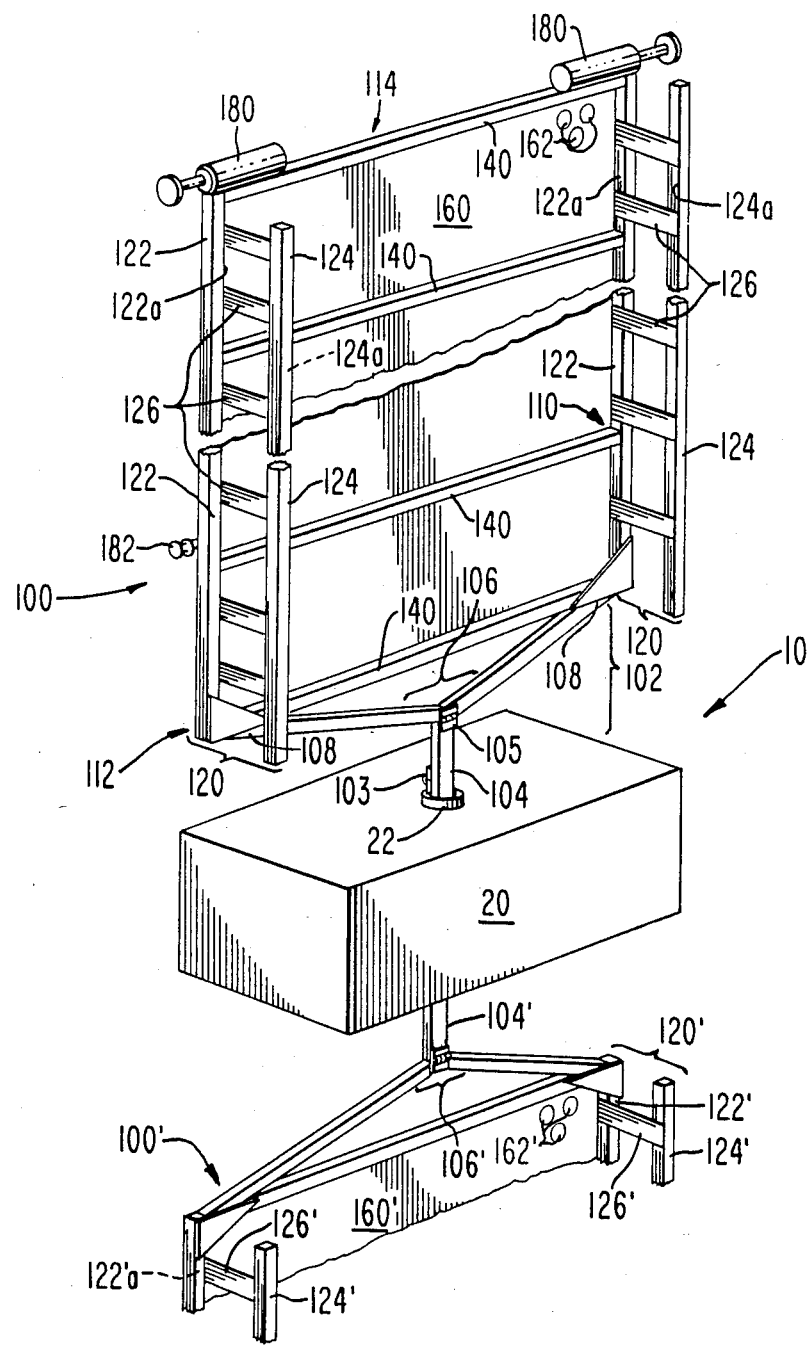
FIG. 1 illustrates a satellite including a pair of solar arrays in accordance with the present invention.

In FIG. 1, a satellite 10 including a body 20 and solar array panels 100 and 100' in accordance with the present invention is illustrated schematically. Reference numerals without primes (') are used in this specification to refer to components of the general structure. Reference numerals with primes (') are used to refer to the components of the array 100' which is shown below body 20 in FIG. 1 when a distinction is being made between the arrays 100 and 100'. Each panel 100 has a rectangular frame 110 comprised of continuous spanwise or longitudinal structural members 120 and continuous chordwise or lateral structural members 140. One of the continuous spanwise members 120 is disposed along each longitudinal edge of the frame 110. Members 120 run the full length of the frame 110 from relatively near the satellite body 20 at an inboard end 112 to relatively distant from the satellite body 20 at an outboard end 114. The chordwise members 140 are oriented perpendicular to the spanwise members 120 and spaced apart along the length of the frame 110. Each chordwise member is rigidly attached to both spanwise members.

This provides a rigid structure across which a solar array substrate in the form of a thin but strong flexible sheet or membrane 160 is streched. This sheet may be made of any appropriate material such as kapton, kevlar, mylar, aluminum, fiber glass, graphite and other appropriate materials. Solar cells 162 for the conversion of solar energy to useful electricity are disposed on one major surface of the substrate.

Each of the spanwise continuous structural members 120 in this preferred embodiment comprises two continuous beams 122 and 124. Beam 122 runs the full length of the frame 110 from its inboard end 112 to its outboard end 114 and is rigidly attached to the chordwise members. The beam 124 is attached to the beam 122 by a plurality of flexible webs 126 which space the beams 122 and 124 apart in a direction perpendicular to the plane of the sheet 160. The webs 126 are fabricated of a material which is stiff enough to hold the beam 124 in the deployed position shown in FIG. 1. The beams 122 and 124 are continuous and free of hinges in order to provide an array frame having uniform characteristics. Normal satellite solar panel anchor and orientation systems may be used with these arrays such as those used with previous hinged arrays for orienting the arrays in their deployed position to maintain them facing the sun. Such systems are referred to herein as array attitude drive systems. The frame 110 is attached to the satellite body 20 by a Y-shaped boom 102 which includes an inboard boom 104 and an outboard boom 106. Inboard boom 104 is the leg of the Y and has one of its ends attached to outboard boom 106 and the other attached to the array attitude drive system 22 on the satellite body 20. The array attitude drive system 22 rotates the deployed boom 102 to maintain the deployed array in a solar energy collecting attitutde. The outer ends 108 of the outboard boom 106 are rigidly attached to the chord member 140 at the inboard end 112 of frame 110. For stowage of the boom 102 during launching, the inner boom 104 is attached to the outer boom 106 by a hinge 105 and to the array attitude drive system by a hinge 103. Both of these hinges are of the type which latches when the hinge straightens out. Thus, these hinges latch, respectively, when inboard boom 104 and outboard boom 106 are in a common plane and when the boom 104 is axially aligned with the drive system as shown in FIG. 1.

Figure 3:
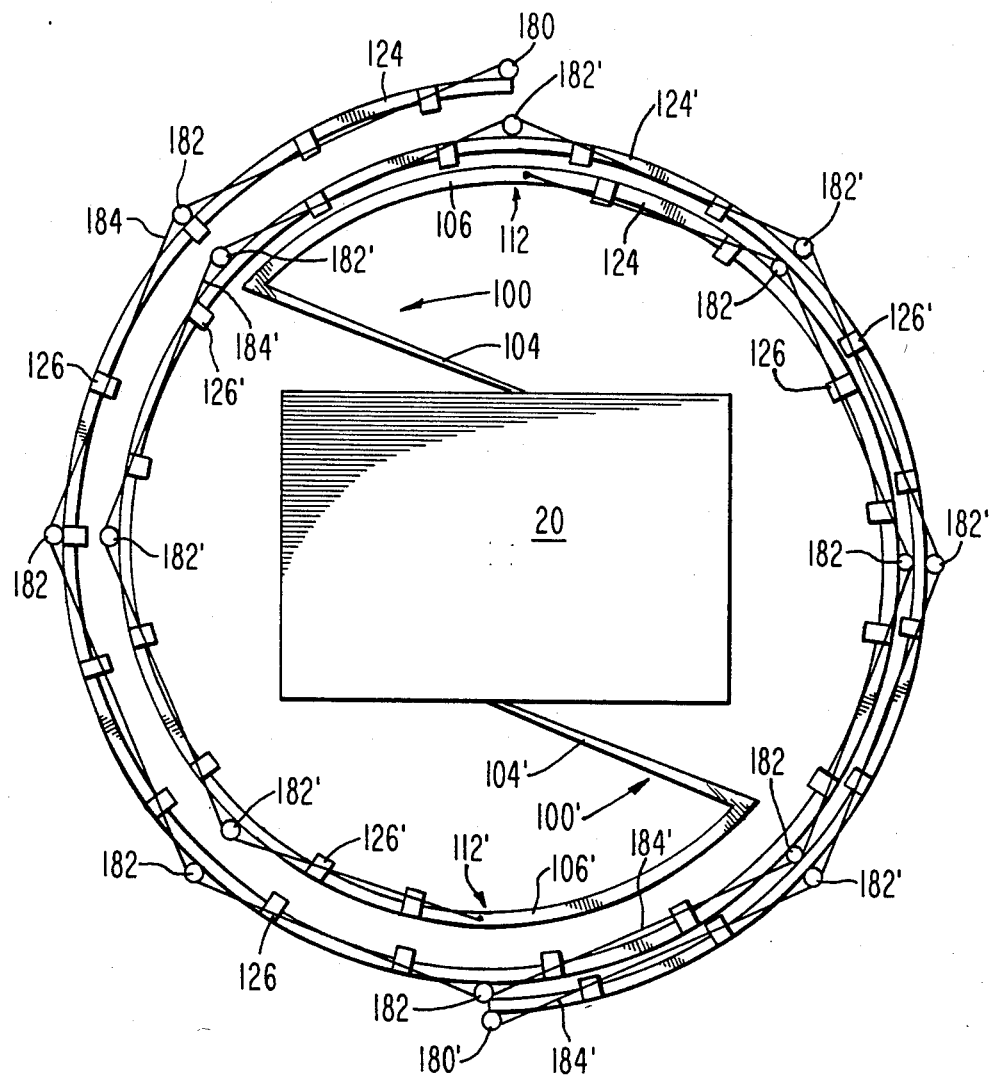
FIG. 3 illustrates the satellite in a stowed condition with the solar arrays wrapped around it.

A continuous motion viscous damper 108 is mounted at the outboard end 114 of each side of frame 110. These dampers store and control the release of a restraint cable 184 (shown in FIG. 3) whose "free" end is attached to the frame near its inboard end 112. This restraint system controls the rate of deployment of its array from a stowed configuration in which it is wrapped around the satellite. A number of pulleys 182 are mounted on the beams 122 to control the position or path of restraining cables 184. These pulleys are preferably spaced at about 45° intervals along the beam 122 in its stowed and wrapped-for-launching configuration (FIG. 3). Other spacings may be used.

Figure 2:
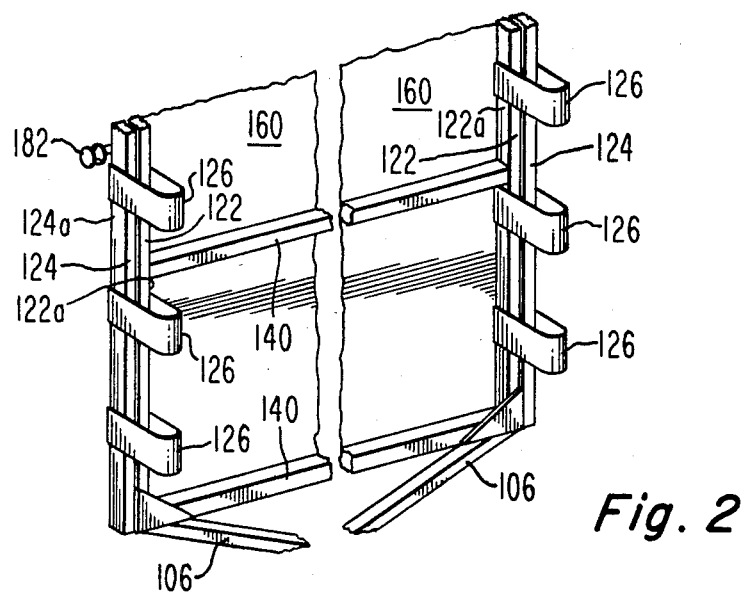
FIG. 2 shows a spanwise member of an array frame of FIG. 1 in a stowed, ready-for-wrapping configuration.

In FIG. 2 a portion of the upper solar array panel 100 is shown with its spanwise members 120 in their stowed configuration. In this configuration the beam 124 has been moved from its deployed position in which it is displaced from the plane of the solar array substrate to a stowed position where it is adjacent the plane of the solar array substrate 160 and adjacent to the beam 122. In the process of moving the beam 124 from its deployed position to this stowed position, the beam is rotated 180° about its long axis. Thus, the side 124a of beam 124 which faces outward in this stowed configuration is the side which faces inward toward the other side of the frame 110 in the deployed configuration. In this stowed configuration the webs 126 are bent in a 180° arc to place their ends which are attached to the beams 122 and 124 parallel. It is preferred that the webs 126 be attached to the sides 122a and 124a, respectively, of beams 122 and 124 which are away from each other when the beams are stowed in this manner. This allows the webs 126 to have a larger bend radius than would be provided if the webs were attached to the abutting sides in FIG. 2. The web material must be flexible enough to withstand being bent into this stowed configuration without taking a set which will prevent the webs from spontaneously returning to their planar position, shown in FIG. 1, once the beam 124 is released from its position adjacent to beam 122.

The configuration shown in FIG. 2 is that in which the array is placed from prior to being wrapped around the satellite in preparation for launch until the end of the upwrapping process at which time the beams 124 release from their position adjacent to the beams 122.

Although the beams 122 and 124 are shown as having identical cross sectional dimensions, the beams 122 and 124 may have different sizes or configurations if desired. In those circumstances, the beam 122 will normally be sized in accordance with the size of the chordwise members 140 and the need to provide the solar array substrate 160 with a desired degree of stiffness. The beams 124 will be sized in accordance with the requirements for forming a deployed spanwise member 120 having a desired degree of stiffness in the direction perpendicular to the plane of the substrate 160.

In FIG. 3, the satellite body 20 and its arrays are illustrated stowed for launching. The hinges 103 and 105 are in their unlatched positions to enable the folding of booms 102. In this stowed configuration arrays 100 and 100' are wrapped around the satellite body 20 in the same direction to form a sprial. The array 100 is attached to the top of body 20 in this FIGURE and array 100' is attached to the bottom of body 20. These arrays may be wrapped with the webs 126 extending either inward or outward as may be preferred and are shown with them extending inward. If the arrays are each longer than one half of the satellite's wrapped circumference, then the arrays 100 and 100' at least partially overlap. Each array is then outermost for one half of the satellite's circumference. In FIG. 3 approximately 360° degrees of wrapping is shown—the amount of wrapping depends on array length. A plurality of spaced apart webs 126 rather than a single continuous web are used to connect the beam 122 to its associated beam 124, both to save unneeded weight and to limit the depth of the spanwise members for wrapping purposes to the depth of the deeper of the beams 122 and 124. This makes the yield stress of the beams 122 and 124 the limiting factor with respect to how small a wrapping radius may be used for the arrays.

The need to wind or wrap the arrays around the satellite for stowage in this manner without exceeding the yield stresses of the beams 122 and 124 limit the depth of these beams in the direction perpendicular to the plane of the sheet 160. So long as the yield stresses of these beams are not exceeded in the wrapping or unwrapping process or during launch, these beams will return to a straight condition upon unwrapping.

Figure 4:
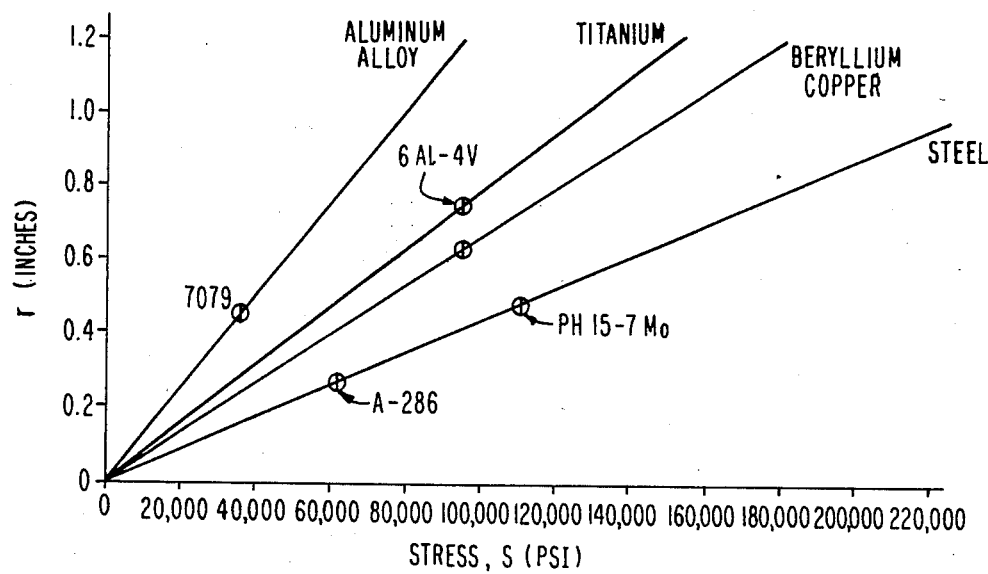
FIG. 4 is a graph plotting material characteristics which are useful for determining the maximum beam depths to be used in the inventive array structure.

FIG. 4 is a graph in which the stress induced in beams of various materials in being wrapped with a radius of 61 inches (154.9 cm) is plotted against the depth of a beam in the direction perpendicular to the array surface 160 in FIG. 1. On each of these straight line plots, the marked point is the position at which two thirds of the material's yield stress is reached for the relatively high strength alloy specified at the mark. The position of these marks in the y-direction indicates the depth that a beam can have while not exceeding this two thirds limit of the yield stress for that alloy. The mark labeled 7079 on the aluminum curve is for the aluminum alloy 7079, the mark labeled 6Al-4V on the titanium curve is for the titanium alloy 6Al-4V, and the marks on the steel curve are for the alloys A-286 and PH15-7Mo. From these values maximum beam depths for the 61 inch (1.54 meter) radius and two thirds yield stress values can be readily determined for each of these representative high strength alloys of their generic classes of materials. Non-metalic materials may be used when they provide the required array characteristics.

The plots in FIG. 4 can be derived from either of the following forms of the stress equation:

$$S = \frac{Er}{2R} \text{ or } r = \frac{2SR}{E},$$

where
r=maximum thickness perpendicular to surface 160 of stowed continuous spanwise member
S=stress induced by wrapping the array
R=the minimum radius of curvature of the wrapped member (61 inches or 1.54 meters for the graphs shown in FIG. 4).
E=the modulus of elasticity for the material in question.

Hollow square cross section beams are preferred for members 122 and 124 in order to provide a maximum moment of inertia for a given mass and available wrapping radius. Other shapes may be used if desired. The maximum beam cross section which can be wrapped for a satellite to be stowed within a 12 foot (3.66 meter) diameter (the limit for the Ariane-4 launch vehicle) varies from about 0.28 inches (0.71 cm) to about 0.73 inches (1.85 cm) for these materials. A large diameter of about 15 feet (4.57 meters) is available on the United States space shuttle and would permit a larger wrapping radius and thus a greater beam depth for a given material. These beam depths are by themselves insufficient to provide the array structure 100 with sufficient stiffness to raise the natural frequency of the deployed array (form movement in the wrapping direction) to acceptable values. Consequently, the post-deployment spanwise structure 120 is provided to increase the stiffness in that direction to a value which avoids coupling of the solar array with the satellite.

The dampers 180, 180', pulleys 182, 182' and the cables 184, 184' thereover hold the panels 100, 100' in the stowed position illustrated in FIG. 3 until their release for deployment. During launch, additional security cables may be wrapped around the entire structure to prevent premature deployment of the panels. These security cables are released prior to panel deployment by an appropriate release mechanism such as pyrotechnic bolts.

In the stowed condition, the deployment control cables 184, 184', lie on chords of the spirals defined by the wrapped arrays. Since these chords are shorter than the arcs along which the arrays lie, the cable must lengthen in order for the arrays to unwrap into the deployed configuration. By limiting the playout rate of the cables the continuous rotation viscous dampers 180 limit the rate at which the arrays unwrap. This unwrapping rate should be limited to a value which prevents damage to the arrays as they unwrap and which prevents excessive overshoot when they reach the fully unwrapped position in which they are planar.

Figure 5:
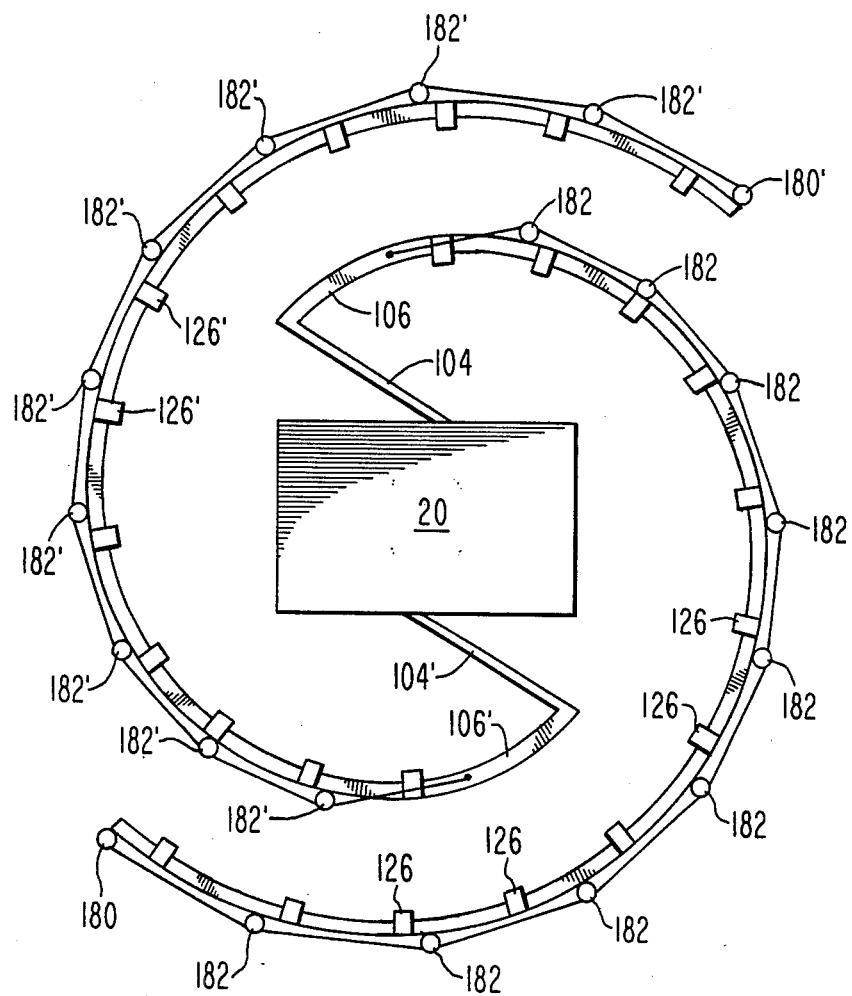
FIG. 5 illustrates the satellite during the deployment process with the solar arrays partially unwrapped from the satellite.

In FIG. 5, the arrays are illustrated partially unwrapped from the satellite body 20 in the process of unwrapping uniformily. At this stage the booms 102 have not yet extended to hold the arrays 100 away from the satellite and the beams 124 are still adjacent the beams 122 with their connecting webs 126 bent.

Figure 6:
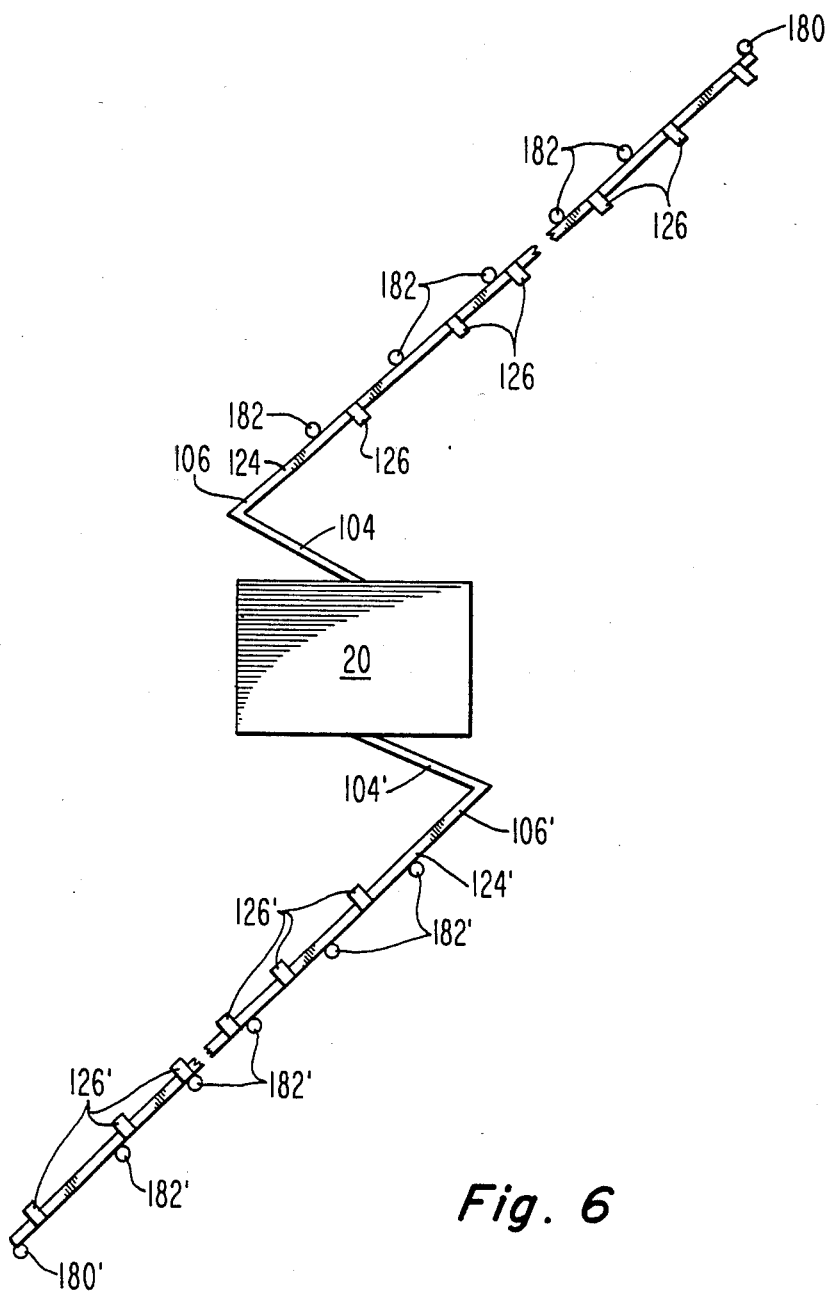
FIG. 6 illustrates the satellite with the solar arrays fully unwrapped but their booms and spanwise members not yet in their deployed configuration.

Continued unwrapping of the arrays from the satellite body leads to the condition illustrated in FIG. 6 in which the arrays are fully unwrapped (sheet 160 is now planar), but the beams 124 are still adjacent the beams 122 and the booms 102 have not yet deployed. Once the deployment has reached this point, the booms may be extended so that their hinges 103 and 105 latch and the beams 124 may be released from their stowed position. This release is normally provided by pyrotechnic bolts or other fasteners. Once beam 124 is released, the webs 126 will spontaneously unfold to their straight condition to place the beams 124 in the position illustrated in FIG. 1. Following the reconfiguration of the spanwise members 120 into their deployed conditions, the inner boom 104 is rotated outward from its stowed position and the hinge 105 at the joint between boom 104 and boom 106 locks in the deployed condition when the boom 104 is in the same plane as boom 106. Once boom 104 is aligned with the axis of the array attitude drive system 22 the inner hinge 103 also latches.

Figure 7:
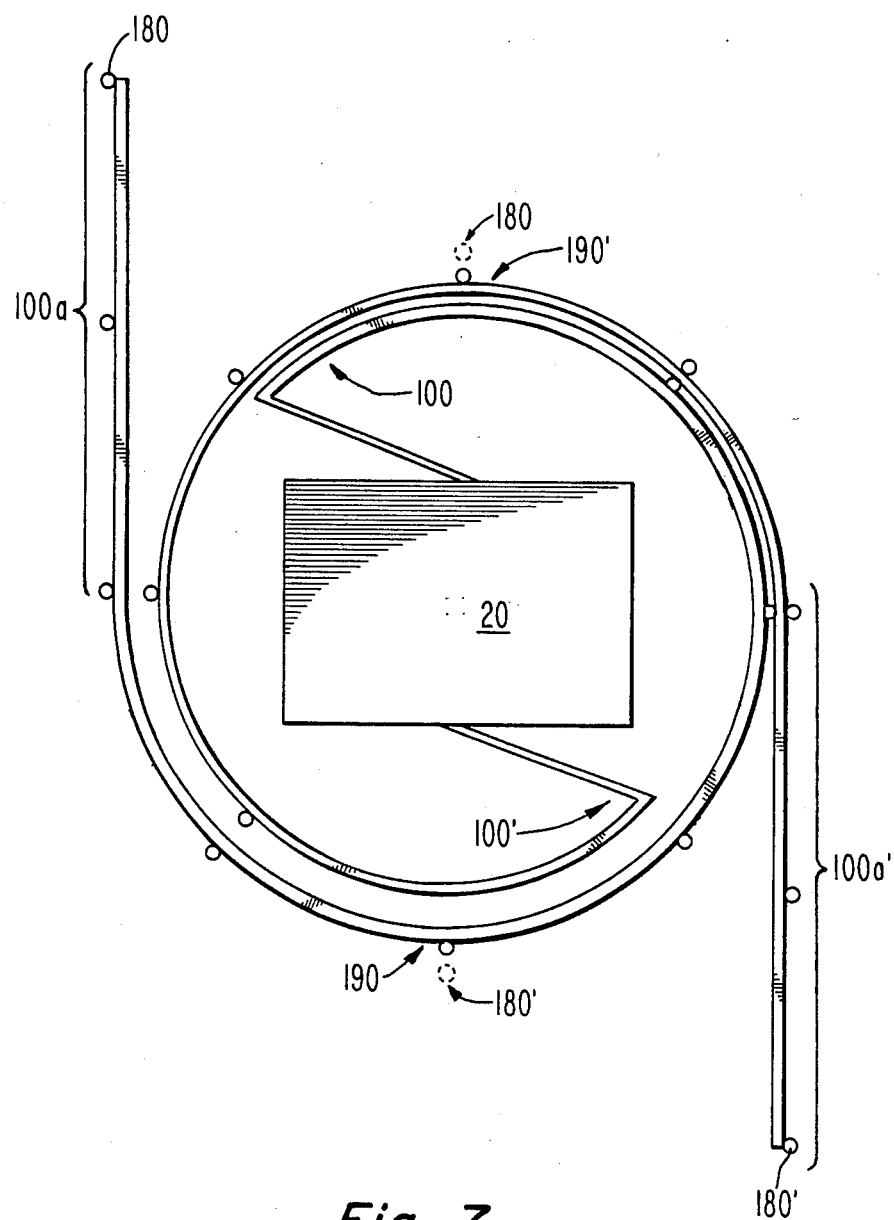
FIG. 7 illustrates the satellite during the deployment process with the solar arrays partially unwrapped from the satellite in accordance with an alternative unwrapping sequence.

Rather than the uniform unwrapping shown in FIG. 5, it may be preferred to unwrap the arrays in a phased manner such as illustrated in FIG. 7. In this phased unwrapping the outer ends of the arrays unwrap to a planar condition before the inner portion begin unwrapping. Thus, in FIG. 7 the array portions 100a and 100a' have unwrapped to a planar condition while the further inboard portions have not begun unwrapping. The original stowed positions of dampers 180, 180' are shown in phantom in FIG. 5. This phased unwrapping ensures that the arrays do not scrape against each other. Such phased unwrapping may be provided by restraining the cable at each pulley until the portion of the array further out than the pulley has straightened. In this way, the unwrapping is progressive and the two arrays 100 and 100' are always unwrapping at opposite sides of the satellite body 20.

Another way of accomplishing this phased wrapping is for the cables from the dampers at the outer ends of the arrays to be secured to their frames at points 190, 190' just outboard of the outer end of the other array. These dampers and cables will then control the unwrapping of only that portion of each array which is outermost in the stowed condition. A second set of dampers with their own cables extending inward would then be mounted at the points 190, 190' to control the unwrapping of the next portions of the arrays after the outermost portions are already planar. In another alternative, such phased unwrapping may be provided by making the stowed array stiffer at its outer end than at its inner end with its stiffness varying monotonically from the outboard end toward the inboard end. This will lead to a natural straightening of the outer end of the array prior to the inner end of the array.

Which surface of the panels 160 the solar cells are placed on is a matter of design choice but is guided by considerations of protecting the solar cells from scraping and other harm during the stowing of the arrays in preparation for launch and during their deployment in space and by power requirements during the geosynchronous transfer orbit. The geosynchronous transfer orbit is used to transfer the satellite from its launch orbit into its geosynchronous position where the solar arrays will be deployed and te satellite will take up its permanent operating location. If both arrays are wrapped with their solar cells inward, then no solar cells will be exposed to collect energy during the transfer orbit which can last as much as three days. If the solar cells on one array are oriented outward, then when the half of the satellite on which that array is outermost faces the sun, its exposed cells will collect power. If both arrays are stowed with their solar cells outward, then the satellite can collect power on whatever portion of its circumference is facing the sun during the transfer to geosynchronous orbit.

Figure 8A:
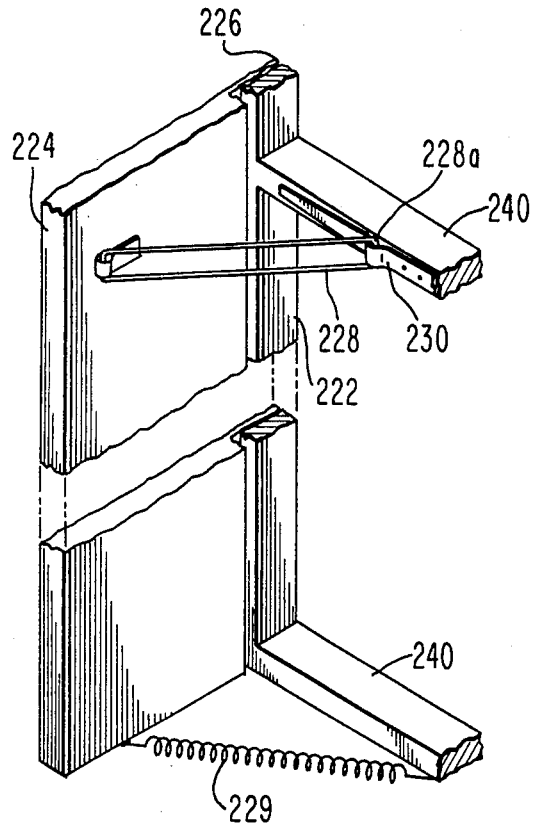
FIGS. 8a, 8b and 9–11 illustrate alternative structures for spanwise members.

Several alternative structures for the spanwise continuous members 110 are illustrated in FIGS. 8a, 8b and 9-11. In FIG. 8a, a deployed spanwise member 220 comprises a beam 222 like beam 122 and a hollow beam 224 having a generally rectangular cross section which is attached by hinges 226 to beam 22. In its stowed condition in FIG. 8b, beam 224 is folded outward until it is in the plane of the chordwise members 240. The hinges 226 have their hinge pins displaced from beam 124 by the depth of the beam 222 to permit it to lie in this plane. A sliding latch 228 may cooperate with a deployment spring 229 to secure the beam 224 perpendicular to the chords 240 in the deployed condition. The beam 224 may be rotated out of the plane of the chords into its deployed condition either by the spring 229 or by spring hinges. As beam 224 rotates out of the plane of the chordwise members toward its deployed condition, the end 228a of latch 228 slides along the chordwise member 240 beneath a spring retainer 230 until it reaches the retention location in which it is shown in FIG. 8a where the spring retainer secures it.

Figure 9:
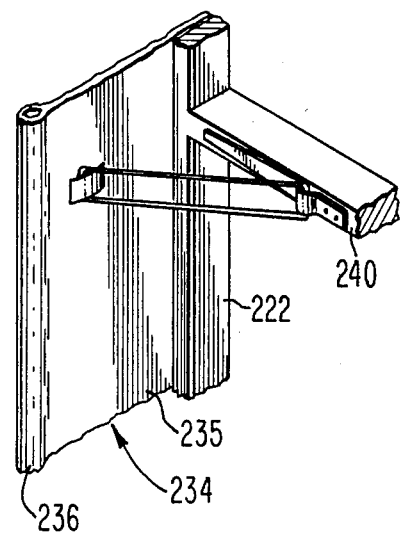
Figure 8B:
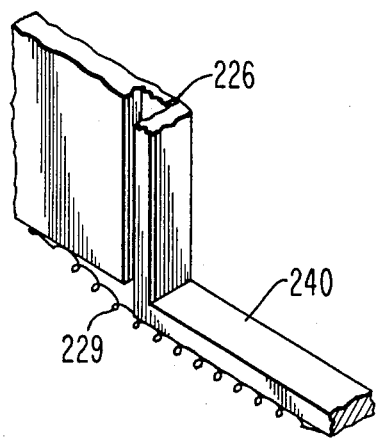

An alternative configuration for such a swingable beam member is illustrated in FIG. 9 where the beam 224 is replaced by a beam 234 comprised of a thin, but stiff sheet 235 having a stiffened rear edge 236.

Figure 10:
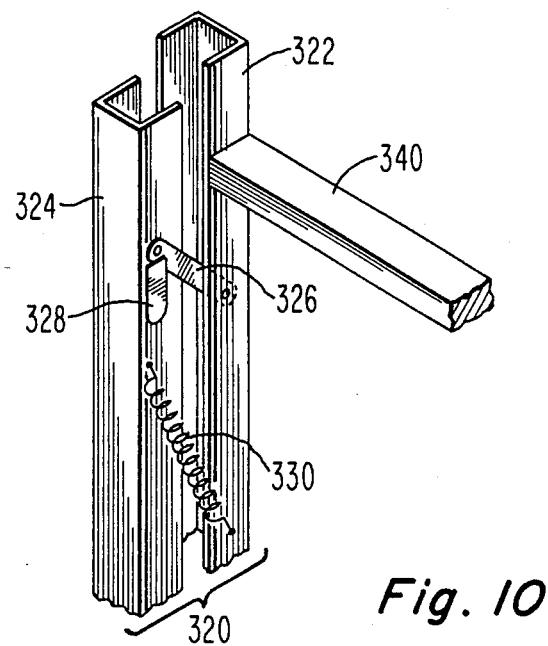

In FIG. 10 another alternative configuration 320 for the spanwise member 120 is illustrated. In this configuration, the spanwise member 320 comprises a beam 322 in the form of a rectangular U shaped channel beam which is secured to the chordwise members 340. Beam 322 has its open side oriented toward the open side of a second rectangular U-shaped member 324. For stowage, the member 324 is interleaved into the member 322. The members 322 and 324 are attached to each other by arms 326 which are pivotably attached to both beams. As the beam 324 is moved from its stowed position to its deployed position, the arms 326 rotate from a vertical position to a horizontal position. The members arms 326 are retained by spring latches 328 in their deployed position once they reach that position. The movement of the member 324 from its stowed to its deployed condition may be controlled by springs 330.

Figure 11:
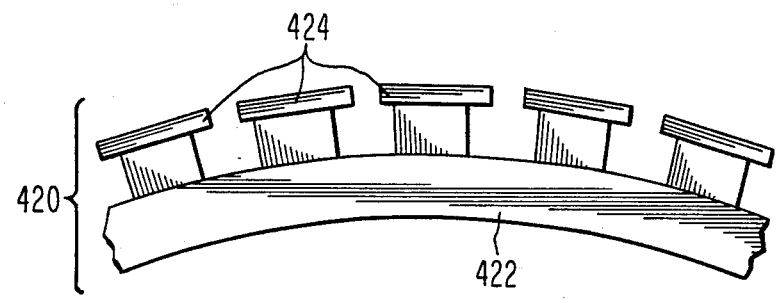

FIG. 11 illustrates a further alternative structure in which a spanwise member 420 comprises a single continuous spanwise beam 422 and a plurality of separate compression caps 424 attached thereto on one side of the beam. The separate caps 424 are sized and positioned to form a single continuous abutting structure when the beam 422 is straight. These compression caps permit the beam 422 to be wrapped around a center which is below the spanwise member 420 in FIG. 11 because these caps do not effect beam stiffness in that bending direction. However, any force tending to bend the member 420 about a center above the member in FIG. 11 is faced with a stiffness in the member which is that of the combined structure in which the compression caps 424 are in contact with each other. This provides a rigid beam having a depth extending from the lower side of beam 422 in FIG. 11 to the upper side of the compression caps 424. This configuration is considered less desirable than those shown in FIGS. 1-3 and FIGS. 5-10 because it provides stiffness in only one direction of bending rather than in both directions of bending as the other structures do. However, this structure can be satisfactory for controlling the natural frequencies of the array structure in a way to prevent undesired coupling between the attitude control system and the array structure. If the compression caps are modified to attach to each other in the deployed configuration, then increased stiffness is provided for bending in both directions. Mechanical latches or magnets may be used to provide this attachment.

What is claimed is:

1. A solar array having a stowed and a deployed configuration for use with a satellite, said array comprising:

an array support frame comprising a pair of spaced-apart substantially parallel spanwise continuous structural members; and a solar array substrate which is supported by said frame and which has a major surface;

each of said spanwise members including a deployable stiffener member and being fabricated of a material and having a stowed configuration in which said array support frame including said stiffener member can be wound about said satellite in a direction perpendicular to said major surface of said substrate without exceeding the yield stress of said spanwise members and which provides said spanwise members with a straightening force to unwind said array frame from said satellite;

said stiffener members being deployed when said array is in its deployed configuration, said stiffener members in their deployed configuration providing said spanwise members with a substantially increased stiffness in said direction perpendicular to said major surface of said substrate.

2. A solar array having a stowed and a deployed configuration for use with a satellite, said array comprising:

an array support frame comprising a pair of spaced-apart substantially parallel spanwise continuous structural members; and a solar array substrate having a major surface and supported by said frame;

said spanwise members being fabricated of a material and having a configuration which when said array is in said stowed configuration, enables said array support frame to be wound about said satellite in a direction perpendicular to said major surface of said substrate without exceeding the yield stress of said spanwise members and which causes said spanwise members to unwind said array frame from said satellite;

said spanwise members, when said array is in said deployed configuration, having a substantially increased stiffness in said direction perpendicular to said major surface of said substrate;

each spanwise member comprising:
first and second parallel, relatively rigid beams; and
means for flexibly interconnecting said first and second relatively rigid beams, said interconnecting means being connected to said first and second beams and spacing said beams apart in a direction perpendicular to said major surface of said solar array substrate when said array is in said deployed configuration and being bent when said array is in said stowed configuration 3. The solar array recited in claim 2 wherein said interconnecting means comprises a plurality of individual flexible web panels spaced apart along the length of said beams.

4. A solar array having a stowed and a deployed configuration for use with a satellite, said array comprising:

an array support frame comprising a pair of spaced-apart substantially parallel spanwise continuous structural members; and a solar array substrate which is supported by said frame and which has a major surface;

each of said spanwise members including a deployable stiffener member and being fabricated of a material and having a stowed configuration in which said array support frame can be wound about said satellite in a direction perpendicular to said major surface of said substrate without exceeding the yield stress of said spanwise members and which provides said spanwise members with a straightening force to unwind said array frame from said satellite;

said stiffener members being deployed when said array is in its deployed configuration, said stiffener members in their deployed configuration providing said spanwise members with a substantially increased stiffness in said direction perpendicular to said major surface of said substrate; wherein:

each of said stiffener members comprises a relatively rigid beam which is disposed substantially adjacent the plane of said solar array substrate when said stiffener member is in its stowed configuration and which is displaced from the plane of said solar array substrate when said stiffener member is in its deployed configuration.

5. The solar array recited in claim 4 wherein said array support frame further comprises a plurality of chordwise continuous structural members attached to said spanwise members and spaced apart along the length of said spanwise members for securing said spanwise members in spaced-apart relation to each other.

6. The solar array recited in claim 4 further comprising:

a pair of cables for controlling the unwinding of said array from the stowed configuration in which it is wound about the body of a satellite to its deployed configuration;

means attached to said array frame at intervals along the length of said frame for supporting said cables and for guiding said cables during the unwinding process; and means connected to said cables for controlling the rate of playout of said cables during said unwinding process.

7. The solar array recited in claim 6 wherein:
said means for controlling comprises a viscous damper.

8. The solar array recited in claim 6 wherein:
said means for supporting comprises a plurality of pulleys spaced apart at intervals along the length of said array frame and extending to the side of said solar array substrate.

9. The solar array recited in claim 4 wherein each spanwise member further comprises:
a second relatively rigid beam disposed substantially parallel to said first recited beam; and
means for spacing said beams apart in a direction perpendicular to said major surface of said solar array substrate when said stiffener member is in its deployed configuration.

10. The solar array recited in claim 9 wherein said means for spacing comprises:
means for flexibly interconnecting said first and second relatively rigid beams, said interconnecting means being connected to said first and second beams and spacing said beams apart in a direction perpendicular to the plane of said solar array substrate when said stiffener member is in its deployed configuration and being bent when said stiffener member is in its stowed configuration.

11. The array recited in claim 4 futher comprising:
means for moving said relatively rigid beam from its stowed position to its deployed position and for maintaining said beam in said deployed configuration.

12. A satellite comprising:
a main body;
first and second solar arrays attached to and extending from said main body and having a stowed and a deployed configuration, each of said solar arrays including:
a solar array support frame comprising a pair of spaced-apart substantially parallel spanwise continuous structural members;
a solar array substrate which is supported by said frame and which has a major surface;
a plurality of solar cells disposed on said major surface of said substrate;

each of said spanwise members including a deployable stiffener member and being fabricated of a material and having a stowed configuration in which said array support frame including said stiffener member can be wound about said satellite in a direction perpendicular to said major surface of said substrate without exceeding the yield stress of said spanwise members and which provides said spanwise members with a straightening force to unwind said array frame from said satellite;

said stiffener members being deployed when said array is in its deployed configuration, said stiffener members in their deployed configuration providing said spanwise members with a substantially increased stiffness in said direction perpendicular to said major surface of said substrate.

13. A satellite comprising:
a main body;
first and second solar arrays attached to and extending from said main body and having a stowed and a deployed configuration, each of said solar arrays including:
a solar array support frame comprising a pair of spaced-apart substantially parallel spanwise continuous structural members;
a solar array substrate which is supported by said frame and which has a major surface;
a plurality of solar cells disposed on said major surface of said substrate;
each of said spanwise members including a deployable stiffener member and being fabricated of a material and having a stowed configuration in which said array support frame can be wound about said satellite in a direction perpendicular to said major surface of said substrate without exceeding the yield stress of said spanwise members and which provides said spanwise members with a straightening force to unwind said array frame from said satellite;
said stiffener members being deployed when said array is in its deployed configuration, said stiffener members in their deployed configuration providing said spanwise members with a substantially increased stiffness in said direction perpendicular to said major surface of said substrate;
wherein:
each of said stiffener members comprises a relatively rigid beam which is disposed substantially adjacent the plane of said solar array substrate when said stiffener member is in its stowed configuration and is displaced from the plane of said solar array substrate when said stiffener member is in its deployed configuration.

14. The satellite recited in claim 13 further comprising:
means for moving said relatively rigid beam from its stowed position to its deployed position and for maintaining said beam in said deployed configuration.

15. The satellite recited in claim 13 wherein each spanwise member further comprises:
a second relatively rigid beam disposed substantially parallel to said first recited beam; and
means for flexibly interconnecting said relatively rigid first and second beams, said interconnecting means being connected to said first and second beams and spacing said beams apart in a direction perpendicular to the plane of said solar array substrate when said stiffener member is in its deployed configuration, and being bent when said stiffener member is in its stowed configuration.

16. A satellite in a stowed configuration for launching comprising:
a main satellite body;
first and second solar arrays wound around said satellite, each of said arrays comprising:
an array support frame comprising a pair of spaced-apart substantially parallel spanwise continuous structural members, each of said spanwise members including a deployable stiffener member;
a solar array substrate which is supported by said frame and which has a major surface;
a plurality of solar cells disposed on said major surface of said substrate;
said spanwise members including said stiffener members in said stowed configuration being wound around said satellite in a direction perpendicular to said major surface of said substrate without exceeding their yield stress and providing a straightening force to unwind said array frame from said satellite body, said deployable stiffener members in their deployed configuration providing said spanwise members with a substantially increased stiffness in said direction perpendicular to said major surface of said substrate.

17. A satellite in a stowed configuration for launching comprising:
a main satellite body;
first and second solar arrays wound around said satellite body, each of said arrays comprising:
an array support frame comprising a pair of spaced-apart substantially parallel spanwise continuous structural members;
a solar array substrate which is supported by said frame and which has a major surface;
a plurality of solar cells disposed on said major surface of said substrate;
said spanwise members in said stowed configuration being wound around said satellite in a direction perpendicular to said major surface of said substrate without exceeding their yield stress, each of said spanwise members including a deployable stiffener member which in its deployed configuration provides said spanwise member with a substantially increased stiffness in said direction perpendicular to said major surface of said substrate;
wherein each of said stiffener members comprises a first relatively rigid beam and each of said spanwise members further comprises:
a second relatively rigid beam disposed laterally adjacent said first beam when said stiffener member is in its stowed configuration; and
a plurality of flexible webs each attached at one end to said first beam and at the other end to said second beam, each of said webs being bent through substantially a 180° arc in said stowed configuration.

18. The satellite recited in claim 17 further comprising:
cables for controlling the unwinding of said arrays from said stowed configuration in which said arrays are wound about said satellite body;
means attached to said array frames at intervals along the lengths of said frames for supporting said cables and for guiding said cables during the unwinding process; and means connected to said cables for controlling the rate of playout of said cables during said unwinding process.

19. The satellite recited in claim 18 wherein:
said means for controlling comprises a viscous damper.

20. The satellite recited in claim 18 wherein:
said means for supporting and guiding comprises a plurality of pulleys spaced apart at intervals along the lengths of said array frames and extending to the side of said solar array substrates with each cable running from one of its pulleys to its next pulley along a chord of the arc of its frame.

* * * * *